United States Patent
Windbacher et al.

(10) Patent No.: US 11,999,601 B2
(45) Date of Patent: Jun. 4, 2024

(54) METHOD FOR DETERMINING THE ROPE REEVING OF A PULLEY BLOCK

(71) Applicant: Liebherr-Werk Ehingen GmbH, Ehingen/Donau (DE)

(72) Inventors: Stefan Windbacher, Ulm (DE); Julian Wehrstedt, Ulm (DE); Hans-Joachim Wenger, Ehingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 1293 days.

(21) Appl. No.: 16/578,056

(22) Filed: Sep. 20, 2019

(65) Prior Publication Data

US 2020/0095100 A1 Mar. 26, 2020

(30) Foreign Application Priority Data

Sep. 21, 2018 (DE) .................. 10 2018 123 301.9

(51) Int. Cl.
  *B66D 3/04* (2006.01)
  *B66C 13/16* (2006.01)
  (Continued)

(52) U.S. Cl.
  CPC .............. *B66D 3/043* (2013.01); *B66C 13/16* (2013.01); *B66D 3/04* (2013.01); *G01B 5/02* (2013.01); *G01B 11/02* (2013.01); *G01B 21/06* (2013.01)

(58) Field of Classification Search
  CPC . B66D 3/043; B66D 3/04; B66D 3/06; B66D 3/08; G01B 5/02; G01B 11/02; G01B 21/06
  See application file for complete search history.

(56) References Cited

U.S. PATENT DOCUMENTS

| 215,985 A | * | 5/1879 | Snowden | .................. B66D 3/18 187/253 |
| 1,524,198 A | * | 1/1925 | Morgan | .................. B66C 15/02 254/269 |

(Continued)

FOREIGN PATENT DOCUMENTS

| CN | 109553014 A | * | 4/2019 | ............... B66D 1/00 |
| CN | 113044748 A | * | 6/2021 | ............... B66D 1/12 |

(Continued)

OTHER PUBLICATIONS

Wikipedia, https://web.archive.org/web/20170813045840/https://de.wikipedia.org/wiki/Flaschenzug, (German Wikipedia page "Flaschenzug" as archhived Aug. 13, 2017 by "Wayback Machine," recovered Jun. 2, 2018, translation provided by the Google search engine) (Year: 2017).*

*Primary Examiner* — Sang K Kim
*Assistant Examiner* — Nathaniel L Adams
(74) *Attorney, Agent, or Firm* — McCoy Russell LLP

(57) ABSTRACT

The disclosure relates to a method for determining the number of rope reevings of a pulley block with a top block and a bottom block, wherein the rope path of at least one rope line of the pulley block, which is covered during a time window, is detected and compared with at least one rope path of a further rope line covered within the time window and/or with the height difference between top block and bottom block changed within the time window, in order to determine the number of rope reevings of the pulley block.

15 Claims, 4 Drawing Sheets

(51) Int. Cl.
*G01B 5/02* (2006.01)
*G01B 11/02* (2006.01)
*G01B 21/06* (2006.01)

(56) References Cited

U.S. PATENT DOCUMENTS

| | | | | |
|---|---|---|---|---|
| 3,228,534 | A * | 1/1966 | Thaeter | B66C 23/605 |
| | | | | 212/311 |
| 3,317,058 | A * | 5/1967 | Kummerman | B66C 6/00 |
| | | | | 212/315 |
| 3,805,967 | A * | 4/1974 | Scannell | B66D 3/00 |
| | | | | 212/323 |
| 4,132,387 | A * | 1/1979 | Somerville | B66D 1/52 |
| | | | | 254/362 |
| 4,151,981 | A * | 5/1979 | Gennep | B66D 3/18 |
| | | | | 254/375 |
| 4,228,682 | A * | 10/1980 | Decker | G01G 19/14 |
| | | | | 73/862.56 |
| 4,324,385 | A * | 4/1982 | Cojean | B63B 27/30 |
| | | | | 414/139.6 |
| 4,597,497 | A * | 7/1986 | Aberegg | B66D 1/54 |
| | | | | 212/278 |
| 6,126,023 | A * | 10/2000 | Durrant-Whyte | B66C 13/06 |
| | | | | 294/81.4 |
| 2003/0205703 | A1* | 11/2003 | McCormick | B66B 1/32 |
| | | | | 254/267 |
| 2019/0119080 | A1* | 4/2019 | Fukumori | B66C 15/065 |
| 2021/0316966 | A1* | 10/2021 | Minami | B66C 1/40 |
| 2022/0119234 | A1* | 4/2022 | Jiang | B66D 1/225 |

FOREIGN PATENT DOCUMENTS

DE 102014018063 A1 6/2016
KR 2021085289 A * 7/2021 ............. B66D 3/06

* cited by examiner

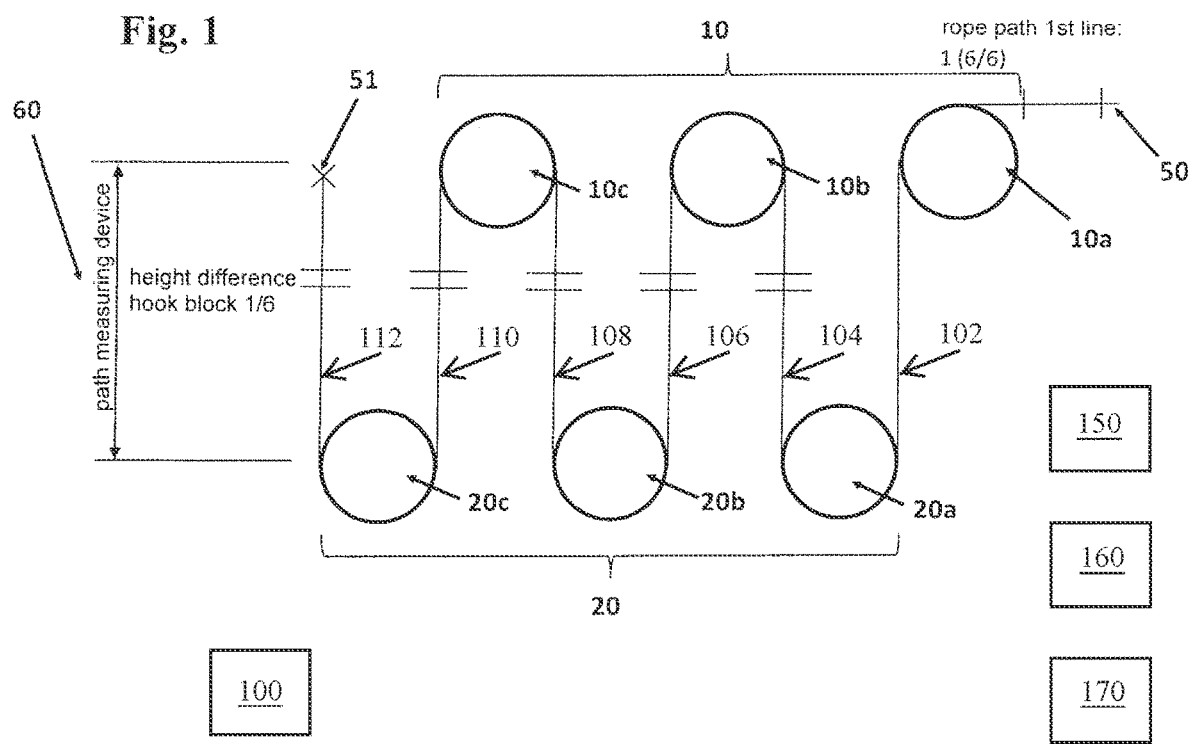

Fig. 2B

| rope pulley | 1 | 2 | 3 | 4 | 5 | 6 | 7 | 8 | 9 | 10 | determined ratio S' | reeving S |
|---|---|---|---|---|---|---|---|---|---|---|---|---|
| | 1 | 0,75 | 0,5 | 0,25 | | | | | | | 0,5 | 4 |
| | 1 | 0,83 | 0,66 | 0,5 | 0,33 | 0,16 | | | | | 0,33 | 6 |
| | 1 | 0,875 | 0,75 | 0,625 | 0,5 | 0,375 | 0,25 | 0,125 | | | 0,25 | 8 |
| | 1 | 0,9 | 0,8 | 0,7 | 0,6 | 0,5 | 0,4 | 0,3 | 0,2 | 0,1 | 0,2 | 10 |

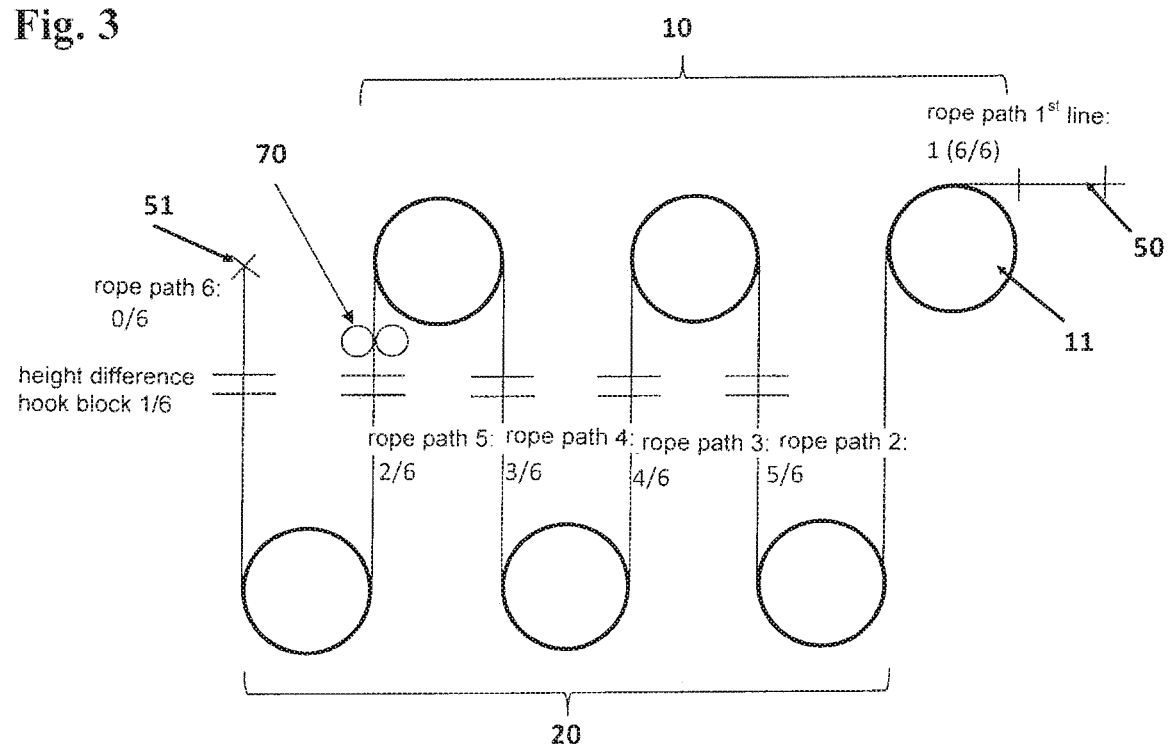

METHOD FOR DETERMINING THE ROPE REEVING OF A PULLEY BLOCK

CROSS REFERENCE TO RELATED APPLICATION

The present application claims priority to German Application No. DE 10 2018 123 301.9 entitled "METHOD FOR DETERMINING THE ROPE REEVING OF A PULLEY BLOCK," filed on Sep. 21, 2018. The entire contents of the above listed application are hereby incorporated by reference for all purposes.

TECHNICAL FIELD

The disclosure relates to a method for determining the number of rope reevings of a pulley block with a top block and a bottom block as well as a corresponding device or a crane with a pulley block and a control unit for executing the method.

BACKGROUND AND SUMMARY

Large cranes with great lifting capacities use a hook block as hoisting means, which via a repeatedly reeved hoisting rope is connected with the roller head at the crane boom. The rollers firmly attached to the trolley head and the loose rollers of the hook block accordingly form a pulley block, wherein the hook block also is referred to as bottom block and the trolley head is referred to as top block.

The number of rope reevings or rope lines formed is defined when rigging the crane and can be fixed variably depending on the application. In terms of control and for optimally monitoring the crane it is desirable to be able to automatically detect the actual number of reevings in order to match the same for example with the rigging information deposited in the crane control unit or also to be able to check the proper rigging of the crane and the function of the pulley block.

Due to such requirements a system for automatically detecting the reeving has already been developed in DE 10 2014 018 063 A1, which by means of a camera installed on the crane detects the pulley block of the crane and then determines the number of reevings by means of image recognition. However, in optical or image-based detection methods their susceptibility to environmental influences always is disadvantageous. Dirt and bad weather conditions, in particular snow, ice and fog, lead to detection errors. The known method also requires the installation of a camera system including image processing processes, which can cause comparatively high additional costs.

Therefore, an alternative solution is sought for, which is able to overcome the aforementioned disadvantages.

This object is achieved by a method for determining the number of rope reevings of a pulley block with a top block and a bottom block. Advantageous embodiments of the method are subject-matter of the dependent claims.

The disclosure proposes a novel method in order to be able in general to automatically detect the number of reevings in pulley blocks of any kind. The use of the method in crane technology is particularly preferred so that here the number of rope reevings can be detected on a hook block of the crane. However, the disclosure will not be limited to this concrete application, although subsequently for reasons of simplicity more detailed explanations merely are provided with respect to the application on the crane.

According to the disclosure, the covered rope path of at least one rope line of the pulley block will be detected during a defined time window in which the pulley block is actuated. At the same time, the rope path of a further rope line and/or the changes of the height difference between top block and bottom block will be detected during this time window. The height difference usually corresponds to the distance between top block and bottom block in vertical direction. Rope path usually is understood to be the rope length unwound from a rope pulley in the time window observed or the rope length unwound from or wound up on a winch. It plays no role for the disclosure in what direction the rope of the pulley block is moved, i.e. the loose end is pulled or let down.

Subsequently, the detected rope path of the first rope line is compared with the detected rope path of the further rope line and/or the detected change of the height difference. Taking into account the physical laws of pulley blocks, in particular as regards the covered rope paths of the individual rope lines, the number of reevings can now be calculated exactly by comparing the at least two measurement values.

For example, in a simple pulley block with a loose roller and a fixed roller a weight attached to the loose roller merely is lifted by half the length by which the rope is pulled at the loose end of the pulley block. The rope path of the second rope line merely is half as large as the rope path of the first rope line. Generally speaking, the rope path covered hence decreases from the first line, which is formed by the loose rope end, in the direction of the succeeding lines. Knowing about this physical relationship, an evaluation unit or control unit now can exactly calculate the number of rope reevings or rope lines on the basis of the detected measurement values. The change of the height difference usually corresponds to the rope path of the last rope line.

The presented method of the disclosure is much more robust with respect to external weather influences. Moreover, in a multitude of pulley blocks suitable measurement systems for the rope path measurement already are present, in particular rope path measurement systems known and even installed already regularly can be employed for measuring the rope path in the field of crane technology. This simplifies the retrofitting of existing pulley block systems and lowers the costs for realizing the method.

According to an advantageous aspect of the disclosure the rope path of at least one rope line can be measured by the rope pulley of the pulley block forming the rope line. Advantageously, the covered revolutions of the rope pulley are detected here and the total rope path during the time window ultimately is determined by incrementation. Alternatively, an additional measurement roller can of course also be incorporated into the pulley block, by which the rope is not deflected, but which merely rolls off on the rope. Here as well, the rope path measurement is possible by means of an incremental revolution measurement of the measurement roller.

It basically applies that a rope path measurement on the rope line preferably is carried out on a fixed rope pulley, i.e. on a rope pulley of the top block or on a rope pulley firmly arranged on the device structure/crane structure. This has the advantage that the necessary energy and signal transmission is simplified.

The rope path of the first rope line of the pulley block either can be determined by the first roller of the pulley block, in a crane e.g. the neck roller at the crane boom, or alternatively according to an embodiment can be measured directly at the hoisting rope winch. As in particular in crane technology the hoisting rope winch generally is equipped with an appropriate sensor system, an existing and proven system can be used here. The length of the hoisting rope unwound from and wound up on the hoisting rope winch then corresponds to the rope path of the first rope line of the pulley block. The hoisting rope winch may also rely on an incremental revolution measurement.

The changes of the height difference between top block and bottom block for example can be effected by a rope path measurement of the last rope line of the pulley block, as the rope path covered there in general actually corresponds to the change in distance between top block and bottom block, i.e. the change of the height difference between the two blocks. As an alternative, the change of the height difference also can be detected by means of a mechanical length sensor. What is also imaginable are alternative measurement methods, for example optical, laser-based or also runtime-based measurement methods, which can determine the distance between top block and bottom block in a suitable way. Merely by way of example, reference here is made to a radar or lidar sensor system, time domain reflectometry, sonar technology or also the use of GPS sensors.

It is particularly advantageous when the at least two rope path measurements are carried out on rope lines of the pulley block spaced apart from each other as far as possible, ideally a rope path measurement is effected on the first and last rope line. It applies: The larger the chosen distance between the rope lines under consideration, the larger the path differences obtained, whereby the susceptibility to errors can be reduced.

According to an embodiment the rope path of the first rope line in the method of the disclosure is determined by the rope path unwound from or wound up on the hoisting rope winch. This value then is divided by the detected change of the height difference between top block and bottom block. The resulting quotient then corresponds to the number of reevings of the pulley block. Due to measurement inaccuracies integer results cannot be obtained here. In such a case, it must be rounded.

Alternatively, it is likewise imaginable that the rope path of the first rope line is determined by the rope path unwound from or wound up on the hoisting rope winch and is placed in a relation to the determined rope path of a succeeding, higher rope line of the pulley block. Here, it is essential that the evaluation unit knows the number of the rope line under consideration. Furthermore, it is provided that in the corresponding evaluation unit appropriate reference values are stored, by whose matching with the measured ratio the number of reevings ultimately can be determined by matching. For example, corresponding ratios between the rope path of the first and each further rope line are kept ready in the control unit for different embodiments of pulley blocks, i.e. pulley blocks with a different number of reevings. The calculated ratio then is numerically compared with reference values kept ready. For each reference value, the number of reevings likewise is deposited. In the case of a correspondence, the number of reevings can be derived directly from the reference values.

As has already been indicated above, the method of the disclosure according to an advantageous embodiment can be executed by a crane control unit of a crane in order to determine the number of reevings of a hook block of the crane.

Beside the method of the disclosure, the present disclosure also relates to a device, according to an advantageous embodiment to a crane, which is configured and suitable for carrying out the method according to the present disclosure. Such a device comprises suitable measuring means for detecting the at least two path lengths, i.e. of the at least one rope path and at least of one further rope path or the change of the height difference between top block and bottom block. Furthermore, such a device comprises at least one evaluation unit which on the basis of the provided measurement values performs calculations in order to ultimately determine the number of reevings.

In addition, the disclosure relates to a crane control unit which is suitable to communicate with appropriate measurement sensors of the crane and on the basis of the received measurement values perform corresponding calculations in order to determine the number of reevings of the pulley block used.

Finally, the disclosure also relates to a data carrier with a program application stored thereon for a control unit, in particular a crane control unit according to the present disclosure.

The advantages and properties of the individual devices mentioned above quite obviously correspond to those of the method according to the disclosure due to their reference to the method of the disclosure, so that a repetitive description will be omitted.

BRIEF DESCRIPTION OF FIGURES

Further advantages and properties of the disclosure will be explained in detail below with reference to exemplary embodiments. In the drawing FIG. 1 shows a first exemplary embodiment of the method of the disclosure, which provides a path measurement between trolley head and hook block, FIG. 2B shows a reference table for the determination of reeving according to the exemplary embodiment of FIGS. 2A and 3, and FIG. 3 shows a third exemplary embodiment of the method, which performs a path measurement directly on the rope line.

DETAILED DESCRIPTION

Figure 2A:
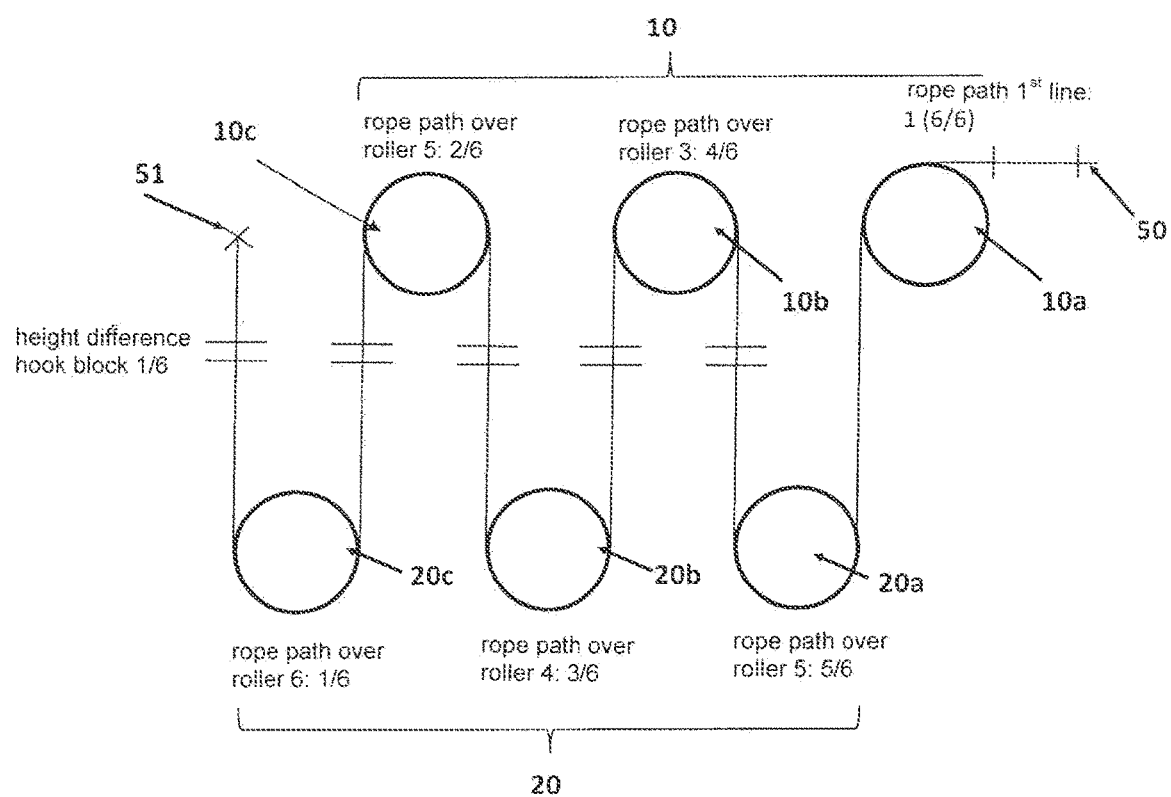
FIG. 2A shows a second exemplary embodiment of the method by means of a path measurement via a rope pulley.

The idea underlying the method of the disclosure consists in determining the number of rope lines of a pulley block by comparing synchronously covered rope paths of different rope lines of the pulley block. Alternatively, the rope path of a rope line can also be compared with the path between top block and bottom block, i.e. the change of the vertical distance between top block and bottom block.

Concretely, the idea of the disclosure will be explained using the example of a crane which as load lifting means comprises a hook block. Due to the course of the hoisting rope over the trolley head of the crane boom to the hook block and back, there is formed a pulley block which is schematically indicated in FIG. 1. Concretely, the pulley block on the one hand is formed by the neck roller 10a mounted on the crane boom together with further rope pulleys 10b, 10c of the trolley head 10 and on the other hand by the "loose" rope pulleys 20a, 20b, 20c of the hook block 20. The hoisting rope 50 extends from a non-illustrated hoisting rope winch 150 of the crane along the boom in the direction of the trolley head (or top block) 10 and is redirected there to the hook block (or bottom block) 20 via the neck roller 10a. A multiple reeving between roller head 10 and hook block 20 is realized by the further rope pulleys 10b, 10c, 20a, 20b, 20c until the hoisting rope 50 ultimately is fastened to the boom at the fixed rope point 51. In sum, a pulley block with a total of six rope pulleys or six reevings is formed.

The crane control unit (or evaluation unit) 100 now can automatically detect the number of rope reevings of the hoisting rope 50 by using the method according to the disclosure. The necessary path measurement on the rope lines may be effected directly on the hoisting rope 50 within a certain time interval, during which the hook block 20 is let down or lifted in a defined way. What is necessary at least are the values at two different points of the pulley block. The crane control unit likewise can determine the average speed from the measured path lengths and the determined time and via the ratio of the covered distances in the same time interval can determine the reeving in a pulley block with sufficient accuracy.

The exemplary embodiment of FIG. 1 here provides a rope path measurement of the first rope line 102, which is carried out by a suitable measuring device (or sensor system) 160 of the hoisting rope winch. By an incremental gyrometer of the hoisting rope winch, the unwound rope path can be determined, which corresponds to the rope path of the first line of the pulley block.

Furthermore, the system comprises a path measuring device 60 which detects a change of the height difference between hook block 20 and top block 10 or trolley head 10 of the crane boom. The concrete configuration of this path measuring device in principle is arbitrary, but a mechanical length sensor (or sensors/sensor system) 170 installed between hook block 20 and trolley head 10 is found to be advantageous. Alternatively, the difference in height might also be effected by means of optical, laser-based or runtime measurement-based measurement methods. By way of example, reference here is made to a suitable radar sensor system, lidar sensor system or sensors for the time domain reflectometry. Both sonar and GPS sensors likewise are suitable for a distance measurement in vertical direction.

For the execution of the method the hook block (or bottom block) 20 now is lowered by the control unit. For this purpose, for example a rope length of a total of 6 m is unwound from the hoisting rope winch in the time interval x. This rope length is measured directly at the hoisting rope winch.

The first rope line 102 of the pulley block completely receives the unwound 6 m of rope, so that the corresponding ratio of the first line is referred to as 6/6. Further rope lines of the pulley block, as shown in FIG. 1, include a second rope line 104 extending between bottom block pulley 20a and top block pulley 10b, a third rope line 106 extending between top block pulley 10b and bottom pulley 20b, a fourth rope line 108 extending between bottom block pulley 20b and (in the embodiment shown, last top block pulley) top block pulley 10c, a fifth rope line 110 extending between (the last top block pulley) top block pulley 10c and (in the embodiment shown, the last bottom block pulley) bottom block pulley 20c, and, finally, a sixth rope line 112 extending from (the last bottom block pulley) bottom block pulley 20c and the fixed rope point 51. As the total of 6 m of unwound rope length are distributed over the total of six rope lines of the pulley block, a defined change of the height difference between hook block 20 and trolley head 10 ultimately is obtained, which generally corresponds to an n-th fraction of the total rope length of 6 m let down from the hoisting rope winch, wherein n represents the number of reevings.

When the change of the height difference hence is detected by means of a length sensor, this measurement value can be compared with the measurement value of the first rope line or the rope length unwound and from this ratio the number S of reevings of the pulley block can be determined in the final analysis. When a rope length of 6 m hence is unwound by the hoisting winch, the hook block 20 must move downwards by a total of 1 m within the same time interval in the configuration of the pulley block depicted in FIG. 1. When lifting the hook block 20 this principle is to be used in a correspondingly adapted form.

Hence, it generally applies that the number S of reevings can be determined as follows:

$$S = \frac{\text{rope path 1st line (time interval } x)}{\text{height difference hook block} - \text{trolley head (in time interval } x)} = \frac{6 \text{ m}}{1 \text{ m}} = 6$$

When no integer calculation results are obtained in practice due to measurement errors etc., the same must be rounded correspondingly.

The same principle can also be executed with a rope path measurement on different rope lines of the pulley block. In the case of a sixfold reeving as shown in FIG. 2A, the first line covers a certain rope path during the time interval x. By lifting or lowering the hook block 20, this rope path of the first line is distributed over the lines 2-6 present in the reeving. Now, the path per time interval of at least one further line can be measured and be placed in relation to the path per time interval of the first line. This ratio determined by the control unit can then be associated with a concrete reeving by comparing the determined ratio against a reference table, as it is shown for example in FIG. 2B. In the Table of FIG. 2B the respective ratio between the rope path in a particular cable pulley is compared with the entire rope path of the first rope line for different pulley block constellations, i.e. a different number of reevings.

The pulley block shown in FIG. 2A differs in its construction from the arrangement of FIG. 1 only by the fact that no path measuring device 60 is provided for detecting the height difference of the hook block 20, but instead the rope path of the fifth rope line in the fifth rope pulley of the pulley block, i.e. in the last rope pulley 10c of the trolley head 10, is measured. This rope path during the time interval x can be detected by an incremental gyrometer installed in the roller 10c and can be compared with the rope length let down from the hoisting rope winch. When the hook block 20 for example is let down by a defined rope length by means of the control unit, i.e. a defined rope length of a total of 6 m is unwound from the hoisting rope winch in the time interval x, this is detected by the incremental revolution measurement in the hoisting rope winch.

This measurement value of 6 m now is placed in relation to the measurement value in the roller 10c, which here is about 2 m. In general, in a path measurement on the roller 5 (rope pulley 10c) the following is obtained for the reference value S':

$$S' = \frac{\text{rope path roller 5 (in time interval } x)}{\text{rope path 1st line (in time interval } x)} = \frac{2 \text{ m}}{6 \text{ m}} = 0.33$$

By matching this calculated reference value S' with the table entries of FIG. 2B, it thus can be detected immediately that the number of reevings "S" is 6.

Alternatively, an example for a pulley block with eight reevings can be determined, wherein here the rope path on the seventh rope pulley, i.e. the last rope pulley of the trolley head 10, is measured by way of example. The reference value S' here is calculated as follows:

$$S' = \frac{\text{rope path roller 7 (in time interval } x)}{\text{rope path 1st line (in time interval } x)} = \frac{2 \text{ m}}{8 \text{ m}} = 0.25$$

A comparison with column seven (seventh rope pulley) of the Table of FIG. 2B shows a correspondence for a pulley block constellation with 8 reevings.

In principle, it is expedient to choose the distance between the rope lines under consideration as large as possible so that the difference of the rope paths is as large as possible. It is also expedient to perform the rope path detection at the rope pulleys of the trolley head, as here both the power supply and the signal transmission from the rope pulley is simplified.

FIG. 3 now shows a last exemplary embodiment of the method according to the disclosure. Here, the rope path of one of the rear rope lines now is not accomplished via a rope pulley 10a, 10b, 10c of the trolley head 10, but instead the same is measured by means of a separate measuring roller 70 which rolls off on the rope line under consideration. The measuring roller 70 comprises at least one roller which rests against the rope and provides for a revolution measurement (incremental path measurement). The determination of reeving would then be effected analogous to the described embodiment as shown in FIG. 2A.

The invention claimed is:

1. A method comprising:
providing a pulley block with a top block and a bottom block; and
determining a number of rope reevings of the pulley block, wherein a rope path of a first rope line of the pulley block, which is covered during a time window, is detected, via sensors, and compared, via programming executed by a control unit, with at least one rope path of a further rope line of the pulley block covered within the time window and/or with a height difference between the top block and the bottom block changed within the time window, in order to determine the number of rope reevings of the pulley block, wherein each rope path corresponds to a length of rope let out or drawn in, wherein each rope path covered during the time window corresponds to the length of rope let out or pulled in during the time window, wherein the number of rope reevings in the pulley block is automatically determined using the sensors and the control unit during the time window in which the pulley block is actuated.

2. The method according to claim 1, wherein the rope path of at least one rope line is measured by a rope pulley of the pulley block forming the rope line path and/or is detected by at least one additional measuring roller which rolls off on the rope line.

3. The method according to claim 2, wherein the rope path is measured via an incremental revolution measurement of the rope pulley or measuring roller.

4. The method according claim 1, wherein the rope path of the first rope line of the pulley block is measured by a hoisting rope winch of the pulley block, wherein the measured rope path corresponds to a length of hoisting rope wound or unwound upon the hoisting rope winch within the time window and a measurement is carried out by an incremental revolution measurement on the hoisting rope winch.

5. The method according to claim 4, wherein the rope path of the first rope line is determined by the rope path wound onto or unwound from the hoisting rope winch and is divided by the detected change of the height difference between the top block and the bottom block, wherein the resulting quotient corresponds to the number of rope reevings.

6. The method according to claim 4, wherein the rope path of the first rope line is determined by the rope path wound onto or unwound from the hoisting rope winch and is compared to a determined rope path of a succeeding rope line of the pulley block.

7. The method according to claim 6, wherein the number of rope reevings is determined by matching a calculated ratio from both rope path values with reference table values.

8. The method according to claim 1, wherein the change of the height difference between the top block and the bottom block is determined using a rope path measurement on a last rope line extending from a last rope pulley of the top block of the pulley block.

9. The method according to claim 1, wherein the change of the height difference between the top block and the bottom block is measured using a mechanical length sensor and/or an optical, laser-based and/or runtime-based measurement method.

10. The method according to claim 1, wherein at least two rope path measurements are carried out on rope lines of the pulley block spaced apart as far as possible.

11. The method according to claim 10, wherein the at least two rope path measurements include a first measurement carried out on the first rope line and a second measurement carried out on a last rope line extending from a last rope pulley of the top block of the pulley block.

12. The method according claim 1, wherein the method is executed by a crane control unit of a crane in order to determine the number of rope reevings at a hook block or another pulley block of the crane.

13. A system comprising:
a pulley block with a top block and a bottom block; and
a device including a measuring device and an evaluation unit, the device configured to carry out a method for determining a number of rope reevings of the pulley, wherein a rope path of a first rope line of the pulley block, which is covered during a time window, is detected, via sensors, and compared, via programming executed by a control unit, with at least one rope path of a further rope line of the pulley block covered within the time window and/or with a height difference between the top block and the bottom block changed within the time window, wherein the measuring device includes the sensors configured to detect the at least two rope paths during the time window, wherein the evaluation unit includes the control unit configured to calculate the rope reeving on the basis of measurement values, wherein each rope path corresponds to a length of rope let out or drawn in, wherein each rope path covered during the time window corresponds to the length of rope let out or pulled in during the time window, wherein the number of rope reevings in the pulley block is automatically determined using the control unit and the sensors during the time window in which the pulley block is actuated.

14. A crane comprising:

a pulley block with a top block and a bottom block; and a control unit configured to communicate with at least two sensors for a rope path measurement on the pulley block, wherein the crane control unit is programmed to carry out a method for determining a number of rope reevings of the pulley block, wherein a rope path of a first rope line of the pulley block, which is covered during a time window, is detected, via the at least two sensors, and compared, via programming executed by the control unit, with at least one rope path of a further rope line of the pulley block covered within the time window and/or with a height difference between the top block and the bottom block changed within the time window, wherein each rope path corresponds to a length of rope let out or drawn in, wherein each rope path covered during the time window corresponds to a length of rope let out or pulled in during the time window, wherein the number of rope reevings in the pulley block is automatically determined using the control unit and the at least two sensors during the time window in which the pulley block is actuated.

15. The crane control unit according to claim 14, wherein the control unit comprises a program application stored on a data carrier for the control unit for executing the method.

* * * * *